3,507,831
PROCESS FOR CURING EPOXY RESINS WITH POLYCARBOXYLIC ANHYDRIDES IN PRESENCE OF N-ALKYL IMIDAZOLES
Paul A. Avis and Jurrianus Bekooy, Delft, Netherlands, assignors to Shell Oil Company, New York, N.Y., a corporation of Delaware
Continuation of application Ser. No. 517,922, Jan. 3, 1966. This application Jan. 29, 1968, Ser. No. 701,475
Claims priority, application Netherlands, Apr. 13, 1965, 6504681
Int. Cl. C08g 23/20
U.S. Cl. 260—47
11 Claims

ABSTRACT OF THE DISCLOSURE

Polyepoxides are converted to insoluble, infusible products by reacting said polyepoxides with a curing amount of a polycarboxylic anhydride in the presence of a from 0.1 to 10 parts by weight of polyepoxide of a N-alkyl imidazole or N-alkyl benzimidazole.

---

This application is a continuation of application Ser. No. 517,922, filed Jan. 3, 1966, now abandoned.

This invention relates to a process for curing polyepoxides. More particularly, the invention relates to a new process for curing polyepoxides using a special type of cyclic curing agent, and to the useful products obtained therefrom.

Specifically, the invention provides a new process for curing and resinifying polyepoxides, and preferably glycidyl polyethers of polyhydric phenols or polyhydric alcohols, which comprises mixing and reacting the polyepoxide with certain imidazole or benzimidazole compounds which possess in the heterocyclic ring a tertiary nitrogen atom.

Polyepoxides, such as, for example, those obtained by reacting epichlorohydrin and polyhydric phenols in the presence of caustic, are promising materials for use in many industrial applications as they can be reacted with curing agents to form insoluble infusible products having good chemical resistance. Many conventional polyepoxide-curing agent systems, however, have certain drawbacks that greatly limit the industrial use of the polyepoxides. For example, the known mixtures comprising the polyepoxides and aliphatic amines set up rather rapidly, and this is true even though the mixtures are stored in air tight containers away from moisture and air. This difficulty necessitates mixing of the components just before use and rapid use of the material before cure sets in. Such a procedure places a considerable burden on the individual operators, and in many cases, gives inferior products because of the inefficient mixing and too rapid operations.

Attempts have been made in the past to solve the above problem by the use of curing agents which are more difficult to react and would thus remain inactive in the polyepoxide composition at lower temperatures. While this action tends to lengthen the pot life or working time of the compositions, it also makes the compositions more difficult to cure. For example, it is known that the pot life can be extended by the use of aromatic amines, but this in turn requires the use of much higher temperatures to effect the ultimate cure. High cure temperatures are undesirable for many epoxy resin applications, such as filament winding operations, encapsulation and the like. It would be desirable to have a curing agent that would give a long pot life and at the same time be effective as a curing agent at the desired lower reaction temperatures to give products having good physical properties.

It is an object of the invention, therefore, to provide a new class of curing agents for polyepoxides. It is a further object to provide new curing agents for polyepoxides that give compositions having a relatively long pot life, but are highly reactive at moderately elevated temperatures. It is a further object to provide a new process for curing polyepoxides that is particularly adapted for use in filament winding operations, encapsulation and the like. It is a further object to provide a new process for curing polyepoxides to give cured products having good physical properties. It is a further object to provide new compositions which are useful and valuable in preparing coatings, castings and the like. These and other objects of the invention will be apparent from the following detailed description thereof.

It has now been discovered that these and other objects may be accomplished by the use as curing agents for the polyepoxides certain imidazole or benzimidazol compounds which possess in the heterocyclic ring a tertiary nitrogen atom. It has been surprisingly found that polyepoxide compositions containing these curing agents have a relatively good pot life at the lower temperatures. When these materials, however, are heated to moderate temperatures, such as 50° C. and above, the mixtures set up to form the hard cured cross-link product. This advantage is particularly desirable for applications where a long pot life is needed but high curing temperatures are undesirable such as in the formation of pottings for certain electrical apparatus, filament winding operations, coating for foams, coatings for certain military equipment and the like.

Additional advantage is also found in the fact that even though the cure takes place at the moderate temperatures, the resulting products still have excellent physical properties, and particularly good elevated temperature properties. It was thought that such properties could be obtained only by use of curing agents such as aromatic amines at high cure temperatures.

The new curing agents to be used in the process of the invention are derived from mononuclear imidozales or benzimidazoles and have the general formula:

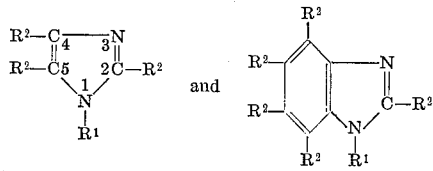

respectively, in which $R^1$ is an alkyl group containing preferably from 1 to 12 carbon atoms, $R^2$ is hydrogen or a hydrocarbon radical, and preferably an alkyl, alkenyl, cycloalkyl, cycloalkenyl, aryl, alkaryl or arylalkyl radicals, and particularly those containing no more than 15 carbon atoms. Examples of such compounds include, among others, N-methyl imidazole, N-isopropyl imidazole, N-butyl imidazole, N-lauryl imidazole, N-butyl-2-ethyl-4-methyl imidazole, N-methyl benzimidazole, N-butyl-2-ethyl-4-methyl benzimidazole, N-isopropyl-2-ethyl-4-phenyl imidazole and mixtures thereof. Especially preferred are the N-alkyl imidazoles and N-alkyl benzimidazoles and the alkyl-substituted N-alkyl imidazoles and N-alkyl benzimidazoles in which the alkyl substituents contain not more than 8 carbon atoms.

The above N-alkyl imidazoles may be prepared for example by reacting an imidazole (or benzimidazole) compound having a secondary imino group in the ring with an alkyl halide and subsequently liberating the N-alkyl imidazole (or benzimidazole) from the resulting product by the addition of caustic alkali solution. The imidazoles per se can be prepared by conventional techniques of reacting a dialdehyde with ammonia and formaldehyde.

The polyepoxides to be used in preparing the compositions of the present invention comprise those materials possessing more than one vicinal epoxy group, i.e., more than one

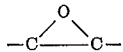

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. Patent 2,633,458. The polyepoxides used in the present process are those having an epoxy equivalency greater than 1.0

Various examples of polyepoxides that may be used in the process of the invention are given in U.S. Patent 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12 - octadecandienoate, butyl 9,12,15 - octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyoctyl) pimelate, di(2,3-expoxybutyl) phthalate, di(2,3-epoxyoctyl) tetrahydrophthalate, di(4,5-epoxydodecyl) maleate, di(2,3 - epoxybutyl) terephthalate, di(2,3 - epoxypentyl) thiodipropionate, di(5,6-epoxytetradecyl) diphenyldicarboxylate, di(3,4-epoxyheptyl) sulfonyldibutyrate, tri-(2,3-epoxybutyl) 1,2,4 - butanetricarboxylate, di(5,6 - epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,2-dicarboxylate, di(4,5-epoxyoctadecyl) malonate.

Another group of the epoxy-containing materials includes those epoxidized esters of unsaturated alcohols and unsaturated carboxylic acids, such as 2,3-epoxybutyl 3,4-epoxypentanoate, 3,4 - epoxyhexyl, 3,4 - epoxypentanoate, 3,4-epoxycyclohexyl 3,4-epoxycyclohexanoate, 3,4-epoxycyclohexyl 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecaneidoate, dioctyl 10,11-diethyl-8,9,12,13-diepoxyeiconsanedioate, dihexyl 6,7,10,11-diepoxyhexadecanedioate, didecyl 9 - epoxyethyl - 10,11-epoxyoctadecanedioate, dibutyl 3 - butyl - 3,4,5,6-diepoxycyclohexane-1,2 - dicarboxylate, dicyclohexyl 3,4,5,6 - diepoxycyclohexane-1,2-dicarboxylate, dibenzyl 1,2,4,5-diepoxycyclohexane-12-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1, 4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. Patent 2,633,458 are good examples of polyepoxides of this type. Other examples include the polyglycidyl ether of 1,1,2,2 - tetrakis(4 - hydrophenyl) ethane (epoxy value of 4.45 eq./100 g. and melting point 85° C.), polyglycidyl ether of 1,1,5,5-tetrakis (hydroxyphenyl) pentane (epoxy value of of 0.514 eq./100 g.) and the like and mixtures thereof. Other examples include the glycidated novolacs as obtained by reacting epichlorohydrin with novon resins obtained by condensation of aldehyde with polyhydric phenols.

The quantities in which the polyepoxides and the heterocyclic curing agents are combined will vary over a wide range. To obtain the best cure, the heterocyclic curing agent is preferably employed in amounts varying from about 0.1 to 30 parts by weight of the curing agent per 100 parts by weight of polyepoxide.

The heterocyclic curing agent can be used in combination with other components such as phenols, mercaptans, triphenyl phosphorus, triphenyl arsenic, triphenyl antimony, amines, amine salts or quaternary ammonium salts, etc. Preferred additives include the mercaptans, phenols, triphenyl phosphorus and the amines, such as, for example, benzyldimethylamine, dicyandiamide, p,p'-bis(dimethylaminophenyl) methan, pyridine, dimethyl aniline, benzyldimethylamine, dimethylethanolamino, dimethyldiethanolamine, morpholine, dimethylaminopropylaminoe, dibutylaminopropylamine, stearyldimethylamine, tri-n-butyl amine, triamylamine, tri-n-hexylamine, ethyl di-n-propylamine, phenylene diamine, diethylene triamine and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like, and mixtures thereof. Other additives include polybasic anhydrides, such as, for example, phthalic anhydride, tetrahydrophthalic anhydride, methyl-3,6-endomethylene-4-tetrahydrophthalic anhydride, chlorendic anhydride, pyromellitic dianhydride, and the like, and the corresponding acids.

The above-noted additives are generally employed in amounts varying from 0.1 part to 25 parts per 100 parts of polyepoxide, and preferably from 1 part to 5 parts per 100 parts of polyepoxide.

If the heterocyclic curing agents are used in combination with polycarboxylic anhydrides, a small amount of the agent, for example, 0.1 to 10 parts by weight per 100 parts by weight of polyepoxide, is usually sufficient.

In the process according to the invention various additives may be incorporated into the polyepoxide compositions, such as pigments, fillers, fibrous materials, dyes, plasticizers and nonvolatile extenders, such as coal tar, coal tar pitch, pine oil, lube oil fractions and aromatic extracts thereof, as well as asphalt.

The curing of the polyepoxides may be accomplished by merely mixing the polyepoxides with the heterocyclic curing agent and heating the combined mixture. If the polyepoxide is a solid or if the heterocyclic curing agent is somewhat viscous or solid, the mixing may be accomplished by heating the components or by use of common solvents. Suitable common solvents include, benzene, toluene, cyclohexane, ketones, ethers, esters, nitriles, and the like. Monoepoxy diluents, such as butyl glycidyl ether, phenyl glycidyl ether, and the like may also be employed.

The temperatures employed during the cure may vary over a wide range. In general, temperatures ranging from about 40 to 300° C. will give satisfactory results. Preferred temperatures range from about 50 to 250° C.

The resinified products obtained by the above-described process have surprisingly high heat deflection temperature and strength values at elevated temperatures. In addition, they display good resistance to boiling water and powerful solvents and chemicals. These unusual properties make the process of particular value in the preparation of adhesives, laminates and molded articles.

The compositions of the invention are particularly useful for filament winding applications. In this application, the filaments, such as, for example, glass fibers, are passed into and through the liquid compositions of the invention and then wound onto the desired mandrel or form and the formed unit allowed to cure, preferably by application of heat. The great advantage of the new compositions in this application is the fact that the compositions can be cured at low temperatures and their use would not effect heat sensitive material being used in the application. For example, the rubber lining of missile cases are heat sensitive and would be effected by the use of high temperatures in curing filaments wound thereon. The new compositions thus could be used for the filament winding of these cases where the winding is directly on the liner.

The compositions of the invention are also particularly useful for encapsulation of electrical or other types of equipment. In many cases it is important to hold such apparatus or equipment in rigid position so that the tubes or other delicate pieces will not be jarred out of position. The epoxy resins are particularly useful for this application because of their good nonconducting properties. The need for heat in curing the epoxy resin, however, had limited their application in this field. The present compositions, however, that can be cured at lower temperatures will find wide use in this field. In such operations, the desired polyepoxide and heterocyclic curing agent are mixed together and the resulting mixture poured in a mold which surrounds the electrical apparatus. After application of slight amount of heat, the composition sets up to the hard cured casting and the encapsulated apparatus can be removed from the mold.

The new compositions of the invention are also useful as adhesives. In this application they can be used as a paste or solution depending on the method of preparation as described above. Other materials may also be included in the composition, such as pigments, plasticizers, stabilizers and reinforcing fillers, such as aluminum powder, asbestos, powdered mica, zinc dust, Bentonite, ground glass fibers, Monetta clay and the like. These fillers are preferably used in amounts varying from about 10 parts to 200 parts per 100 parts of the polyepoxide and curing agent. Other materials that may be included include other types of resins, such as phenol-aldehyde resins, urea-aldehyde resins, furfural resins, polyacetal resins, polycarbonate resins, polyamide resins, and the like.

The compositions may be used in the bonding of a great variety of different materials, such as metal-to-metal to other materials, such as plastic, wood-to-wood, glass-to-glass, glass-to-metal, and the like. They are of particular value, however, in the bonding of metals such as aluminum-to-aluminum and steel-to-steel. When applied as an adhesive, the compositions may simple be spread on the desired surface to form films of various thicknesses, e.g., 0.5 mil to 30 mils, and then the other surface superimposed and heat applied. Curing pressures can be light contact pressures up to about 500 p.s.i.

The compositions are also useful for preparing laminates. In preparing the laminate, the sheets of fibrous material are first treated with the mixture of polyepoxide and curing agent. This is conveniently accomplished by spreading the paste or solution containing the above-noted mixture onto the sheets of glass cloth, paper, textiles, etc. The sheets are then superimposed and the assembly cured under heat and pressure. The assembly is preferably cured in a heated press under a pressure of about 25 to 500 or more pounds per square inch and temperatures of about 100 to 300° C. The resulting laminate is extremely strong and resistance against heat and the action of organic and corrosive solvents.

The fibrous material used in the preparation of the laminates may be of any suitable material, such as glass cloth and matting, paper, asbestos paper, mica flakes, cotton bats, duck muslin, canvas, synthetic fibers, such as nylons, dacron, and the like. It is usually preferred to utilize woven glass cloth that has been given prior treatment with well known finishing or sizing agents, therefore, such as chrome methacrylate or vinyl trichlorosilane.

To illustrate the manner in which the invention may be carried out, the following examples are given. It is to be understood, however, that the examples are for the purpose of illustration and invention is not to be regarded as limited to any of the specific materials or conditions recited therein. Polyepoxides referred to by letter are those described in U.S. Patent 2,633,458.

Example I

This example illustrates the use of N-methyl imidazole and N-butyl imidazole to cure Polyether A [i.e., a glycidyl ether of 2,2-bis-(4-hydroxyphenyl)propane].

100 parts of Polyether A are mixed with 5 parts of N-methyl-imidazole and the mixture heated in a mold for 8 hours at 60° C. The resultant casting has a heat deflection temperature of 116.5° C. N-butylimidazole (5 parts per 100 parts of Polyether A) is used under the same conditions. A casting is obtained which has a heat deflection temperature of 128° C.

By way of comparison, a mixture of 100 parts of Polyether A and 12 parts of tri(2-ethyl-hexanoic acid) salt of tri(dimethylamino methyl) phenol is cured under the same conditions. The heat deflection temperature of this casting is only 67° C.

Example II

Several mixtures are prepared by mixing 100 parts of Polyether A with 80 parts of hexanhydrophthalic anhydride, in each case with one of the amines given in Table I. The mixtures are cured in a mold in accordance with the cure cycle shown in Table 1, the heat deflection temperature (HDT) of the casting is subsequently determined and is given in the table.

TABLE I

| Amine | Parts | Cure cycle, hrs./° C. | HDT, ° C. |
|---|---|---|---|
| N-methyl imidazole | 0.5 | 3/80+2/150 | 146.6 |
| N-isopropyl imidazole | 0.5 | 2/80+4/150 | 139.5 |
| N-butyl imidazole | 0.5 | 3/80+2/150 | 140 |
| N-lauryl imidazole | 0.66 | 2/80+4/150 | 138.5 |
| Benzyldimethylamine | 0.66 | 2/80+4/150 | 129.5 |

It is apparent from the table that the use of N-alkyl imidazoles results in a higher heat deflection temperature at a usually more rapid rate of curing.

Mixture of 100 parts of polyether A, 80 parts of hexahydrophthalic anhydride and 2 parts of the amines indicated in Table II are cured in a mold for 4 hours at 150° C. The resultant castings have the following mechanical properties.

TABLE II

| Amine (mechanical properties) | N-butyl-imidazole | 2-ethyl-4-methyl-imidazole | benzyl-dimethyl-amine |
|---|---|---|---|
| Tensile strength, kg./cm.$^2$ | 710 | 660 | 624 |
| Ultimate tensile strain, percent | 3.8 | 3.2 | 2.0 |
| Flexural yield strength, kg./cm.$^2$ | 1,184 | 1,169 | 1,446 |
| Flexural yield deflection, mm | 10.0 | 10.1 | 8.7 |
| Modulus of elasticity, kg./cm.$^2$ | 26,300 | 26,000 | 36,400 |

Example III

Several mixtures are prepared by mixing 100 parts of Polyether A with 90 parts of methyl-3,6-endomethylene-4-tetrahydrophthalic anhydride, in each case with the following amounts of amine. These mixtures are then cured ni a mold in accordance with the cure cycle shown in Table III, the heat deflection temperature (HDT) is subsequently determined and is given in the table.

TABLE III

| Amine | Parts | Cure cycle, hrs./°C. | HDT, °C. |
|---|---|---|---|
| N-methyl imidazole | 0.5 | 2/100+4/150 | 170.5 |
| N-butyl imidazole | 0.5 | 2/100+4/150 | 168 |
| Benzyldimethyl amine | 1.5 | 2/125+2/200+2/260 | 160 |
| Tri(dimethyl aminomethyl) phenol | 1.0 | 4/90+12/150 | 127 |

It was found that the use of N-alkyl-imidazoles resulted in a higher heat deflection temperature at a more rapid rate of curing.

Example IV

Several mixtures are prepared by mixing 100 parts of Polyether A with 75 parts of phthalic anhydride, in each case with the following amounts of amine. The mixtures are cured in accordance with the cure cycle shown in Table IV, the heat deflection temperature (HDT) is subsequentially determined and is given in the table.

TABLE IV

| Amine | Parts | Cure cycle, hrs./° C. | HDT, °C. |
|---|---|---|---|
| N-methyl imidazole | 0.1 | 2/130+2/150 | 157 |
| N-butyl imidazole | 0.1 | 2/130+2/150 | 157 |
| Benzyldimethyl-amine | 0.1 | 2/130+10/150 | 149 |

It was again found that the use of N-alkyl imidazoles resulted in a higher heat deflection temperature in a considerably shorter curing time.

Example V

Examples I and II are repeated with the exception that the Polyether A is replaced by an equivalent amount of Polyether B and C. Related results are obtained.

Example VI

About 100 parts of diglycidyl ether of resorcinol is combined with 5 parts of N-methyl imidazole and the mixture heated at 70° C. for several hours. The resulting product is a hard insoluble infusible product having good high temperature properties.

Example VII

About 100 parts of a glycidated novolac resin obtained by reacting a phenol-formaldehyde condensate with epichlorohydrin is mixed with 5 parts of N-methyl imidazole. This mixture is heated to 70° C. for several hours. The resulting product is a hard insoluble infusible product having good high temperature properties.

Example VIII

Example I is repeated with the exception that Polyether A replaced by a 50:50 mixture of Polyether A and epoxidized methyl cyclohexenyl methylcyclohexenecarboxylate. Related results are obtained.

Example IX

Examples I and II are repeated with the exception that the curing agent is N-methyl benzimidazole and N-butyl benzimidazole. Related results are obtained.

We claim as our invention:

1. A process for converting polyepoxides to insoluble infusible products which comprises mixing and reacting a polyepoxide having more than one vic-epoxy group with a curing amount of a polycarboxylic anhydride in the presence of from about 0.1 to about 10 parts by weight per 100 parts by weight of of polyepoxide of a heterocyclic compound selected from N-alkyl imidazoles and N-alkyl benzimidazoles, said reaction being accomplished at a temperature above about 40° C.

2. A process according to claim 1 wherein the polyepoxide is a glycidyl polyether of a polyhydric phenol having a 1,2-epoxy equivalency between 1.1 and 2.0 and a molecular weight between 200 and 900.

3. A process according to claim 1 wherein the N-alkyl imidazole compound and the N-alkylbenzimidazole compound have the general formula:

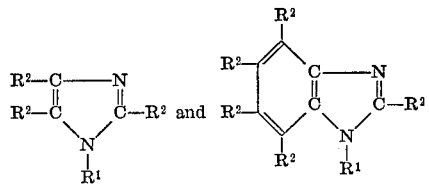

respectively, in which R$^1$ is an alkyl group having from 1 to 12 carbon atoms and R$^2$ is hydrogen or a hydrocarbon radical.

4. A process according to claim 3 wherein R$^1$ is an alkyl group from 1–8 carbon atoms and R$^2$ is hydrogen.

5. A process according to claim 3 wherein the heterocyclic compound is selected from N-butyl imidazole, N-methyl imidazole, N-lauryl imidazole, N-isopropyl imidazole, and N-methyl benzimidazole.

6. A process according to claim 2 wherein the polycarboxylic anhydride is an aromatic hydrocarbon polycarboxylic anhydride.

7. A process according to claim 1 wherein the polycarboxylic anhydride is an aliphatic hydrocarbon polycarboxylic anhydride.

8. A curable composition comprising a mixture of a polyepoxide possessing more than one vic-epoxy group, a curing amount of a polycarboxylic anhydride and from about 0.1 to about 10 parts by weight per 100 parts by weight of polyepoxide of a heterocyclic compound selected from N-alkylimidazoles and N-alkyl benzimidazoles.

9. A composition as defined in claim 8 in which the heterocyclic compound is N-methyl imidazole, N-isopropyl imidazole, N-butyl imidazole, N-lauryl imidazole, or N-methyl benzimidazole.

10. A composition as defined in claim 8 wherein the polyepoxide is a glycidyl polyether of a polyhydric phenol.

11. A curable composition comprising a mixture of a polyepoxide possessing more than one vic-epoxy group and a curing amount of a heterocyclic compound having the general formula:

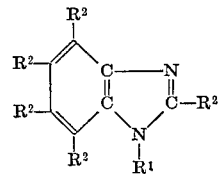

wherein $R^1$ is an alkyl group and $R^2$ is hydrogen or a hydrocarbon radical.

References Cited

UNITED STATES PATENTS 3,394,105  7/1968  Christie.
3,277,049  10/1966  Green.

OTHER REFERENCES

Houdry Process Corp., Preliminary Data Bulletin, "Imidazoles," Apr. 8, 1959 (pp. 1–11 relied on).

WILLIAM H. SHORT, Primary Examiner

T. PERTILLA, Assistant Examiner

U.S. Cl. X.R.

106—273; 117—161, 124, 127; 161—185, 184; 260—2, 18, 28, 59, 37, 33.6 830, 381, 834, 836